US008625844B2

(12) United States Patent
Chen

(10) Patent No.: US 8,625,844 B2
(45) Date of Patent: Jan. 7, 2014

(54) METHOD AND DEVICE FOR ADJUSTING OUTPUT FRAME

(75) Inventor: Ming-Yu Chen, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 1082 days.

(21) Appl. No.: 12/344,271

(22) Filed: Dec. 25, 2008

(65) Prior Publication Data

US 2009/0169058 A1 Jul. 2, 2009

(30) Foreign Application Priority Data

Dec. 31, 2007 (TW) ................................ 96151587 A

(51) Int. Cl.
*G06K 9/00* (2006.01)

(52) U.S. Cl.
USPC ............................................ 382/103; 463/36

(58) Field of Classification Search
USPC .............. 382/103, 107, 154, 276; 348/47–60;
345/7, 8, 9, 55, 156, 157, 158, 419,
345/427; 702/152, 153; 463/36, 37
See application file for complete search history.

(56) References Cited

U.S. PATENT DOCUMENTS

| 5,574,836 | A | * | 11/1996 | Broemmelsiek | ............... | 345/427 |
| 6,009,210 | A | | 12/1999 | Kang | | |
| 6,011,581 | A | * | 1/2000 | Swift et al. | ....................... | 348/58 |
| 6,864,912 | B1 | * | 3/2005 | Mahaffey et al. | ............... | 348/61 |
| 7,203,911 | B2 | * | 4/2007 | Williams | ...................... | 715/864 |
| 7,874,917 | B2 | * | 1/2011 | Marks et al. | .................... | 463/36 |
| 7,883,415 | B2 | * | 2/2011 | Larsen et al. | ................... | 463/36 |

FOREIGN PATENT DOCUMENTS

| TW | 455769 | 9/2001 |
| TW | 200634665 | 10/2006 |
| TW | 200643806 | 12/2006 |
| TW | 200725567 | 7/2007 |
| TW | 200727101 | 7/2007 |
| WO | 2007004377 A1 | 1/2007 |

OTHER PUBLICATIONS

"Office Action of Taiwan Counterpart Application", issued on Apr. 14, 2011, p. 1-p. 11.
"2nd Office Action of European Counterpart Application", issued on Jul. 20, 2010, p. 1-p. 5.
Nicholas J. Ward et al., "Head-Up Displays and Their Automotive Application: An Overview of Human Factors Issues Affecting Safety", Accident Analysis & Prevention, vol. 26, No. 6, Dec. 1994, pp. 703-717.
"Search Report of European counterpart application", issued on May 8, 2009, p. 1-p. 8.
"1st Office Action of China Counterpart Application", issued on Jun. 4, 2010, p. 1-p. 4.

* cited by examiner

*Primary Examiner* — Brian Le
(74) *Attorney, Agent, or Firm* — Jianq Chyun IP Office

(57) ABSTRACT

A method and a device for adjusting an output frame are provided. The present disclosure is suitable for an electronic device with a display. In the present disclosure, a relative position between a user and the display is obtained first. Then, an output frame which will be outputted by the display later is adjusted according to the relative position. As a result, the output frame is adjusted in advance to fit the present position of the user, so that the user views the output frame more easily and enjoys the best display result.

20 Claims, 5 Drawing Sheets

METHOD AND DEVICE FOR ADJUSTING OUTPUT FRAME

CROSS-REFERENCE TO RELATED APPLICATION

This application claims the priority benefit of Taiwan application serial no. 96151587, filed on Dec. 31, 2007. The entirety of the above-mentioned patent application is hereby incorporated by reference herein and made a part of this specification.

BACKGROUND OF THE INVENTION

1. Field of the Invention

The present invention is related to a method and a device for outputting a frame, and particularly to a method and a device capable of automatically adjusting the output frame according to a user's position.

2. Description of Related Art

As displaying technology advances rapidly, types of displays also evolve from cathode ray tube (CRT) displays in the early days, to flat panel displays capable of reducing more occupied space, and further to touch displays which have been extensively applied to all kinds of electronic products nowadays.

From a user's viewpoint, display result of a display most directly influences the impression the user has after using an electronic product. The user can adjust parameters of the display, such as resolution, contrast and luminance, to obtain a better output frame according to his/her own habits. However, when outputting frames through the display, current electronic products usually cannot automatically adjust the frame dynamically according to the user's current position. For example, generally, the size of the words displayed on the frame is fixed, and therefore when the user keeps a farther distance from the display, the user very possibly cannot clearly see the contents of the frame because the words on the frame are too small.

When the user views a frame displayed by a liquid crystal display (LCD), the frame is also affected and limited by gray scale inversion of the LCD such that when viewed at certain angles the user would see frames like those in black and white inversion. Moreover, as for most current naked-eye 3D displays, in the actual implementation of the 3D displays, barriers or micro-prisms are disposed therein to limit the left eye of the user to view pixels on the left and the right eye of the user to view pixels on the right so as to achieve the three-dimensional display effect. Therefore, when the user views a 3D display, the viewing is limited by view angles. When the user is located at a dead view angle, the left eye of the user can only see the pixels on the right, and the right eye of the user can only see the pixels on the left. At this moment, the frame seen by the user is broken.

As such, if the display cannot adjust an output frame correspondingly according to the user's current position, the display function is very easily limited and will display many display results that are unacceptable to viewers. Since the user cannot see the displayed frames clearly, more negative impressions of the electronic products are likely to be formed.

SUMMARY OF THE INVENTION

In view of the foregoing, the present disclosure provides a method for adjusting an output frame, which adjusts the output frame correspondingly according to a position where a user views a display so as to generate a better output result.

The present disclosure provides a device for adjusting an output frame. After detecting a relative position between a user and a display, the device automatically adjusts the output frame according to the relative position so as to render it more convenient for the user to view the output frame.

The present disclosure provides a method for adjusting an output frame, which is suitable for an electronic device with a display. In the method, a relative position between the user and the display is obtained first. Next, the output frame of the display is correspondingly adjusted according to the relative position.

According to an embodiment of the present disclosure, the step of obtaining the relative position between the user and the display includes capturing an input image including the user, obtaining a facial feature of the user from the input image, and then determining the relative position between the user and the display according to the facial feature. The facial feature can be eye positions, a nose position, a mouth position or a facial outline of the user.

According to an embodiment of the present disclosure, the step of determining the relative position according to the facial feature includes determining a rotating angle of the user relative to the display according to an angle formed by a connected line of the eye positions and a rotating reference line preset on the input image.

According to an embodiment of the present disclosure, the step of determining the relative position according to the facial feature includes determining a shift of the user relative to the display according to a shift reference point on the input image and a position of the facial feature in the input image.

According to an embodiment of the present disclosure, the step of determining the relative position according to the facial feature includes obtaining a size and proportion of the facial feature relative to the input image and comparing the size and proportion with a proportion reference value so as to determine a distance between the user and the display.

According to an embodiment of the present disclosure, the step of correspondingly adjusting the output frame according to the relative position includes scaling the output frame, rotating the output frame, shifting the output frame, adjusting colors of the output frame, changing contents of the output frame and adjusting pixels of the output frame to optimize display result of the output frame.

From another viewpoint, the present disclosure provides a device for adjusting an output frame. The device for adjusting the output frame includes a display, a user detecting module, a relative position obtaining module and an image processing module. The display displays the output frame. The user detecting module obtains an input information related to the user. The relative position obtaining module is connected to the user detecting module and determines the relative position between the user and the display with the input information. The image processing module is connected to the display and the relative position obtaining module and adjusts the output frame correspondingly according to the relative position between the user and the display so as to control the display to display the adjusted output frame.

According to an embodiment of the present disclosure, the user detecting module is an image capturing device and captures an input image including the user as the input information. Herein, the relative position obtaining module obtains a facial feature of the user from the input image captured by the user detecting module and determines the relative position between the user and the display according to the facial feature.

According to an embodiment of the present disclosure, the user detecting module can be an image capturing device. The facial feature can be eye positions, a nose position, a mouth position or a facial outline of the user.

According to an embodiment of the present disclosure, the relative position obtaining module determines a rotating angle of the user relative to the display according to an angle formed by a connected line of the eye positions and a rotating reference line on the input image.

According to an embodiment of the present disclosure, the relative position obtaining module determines a shift of the user relative to the display according to a shift reference point on the input image and a position of the facial feature in the input image.

According to an embodiment of the present disclosure, the relative position obtaining module obtains a size and proportion of the facial feature relative to the input image and compares a proportion reference value and the size and proportion to determine a distance between the user and the display.

According to an embodiment of the present disclosure, the image processing module scales the output frame, rotates the output frame, shifts the output frame, adjusts colors of the output frame, changes contents of the output frame or adjusts pixels of the output frame according to the relative position so as to optimize display result of the output frame.

In the present disclosure, the output frame is adjusted correspondingly according to the relative position between the user and the display when the user is viewing the display. In other words, the display of the present disclosure outputs the frame most suitable for the user to view in the current position such that the user can view the contents of the output frame with a more relaxing manner and enjoy the best display result at the same time.

In order to make the aforementioned and other objects, features and advantages of the present disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

When outputting a frame through a display, if an electronic device can timely adjust the size, angle or even the contents of the output frame according to the current state of a user, the user certainly can experience better viewing result. The present disclosure is a method and a device for adjusting an output frame which are developed from said viewpoint. In order to render the present disclosure more comprehensible, embodiments are described below as the examples to prove that the disclosure can actually be realized.

Figure 1:
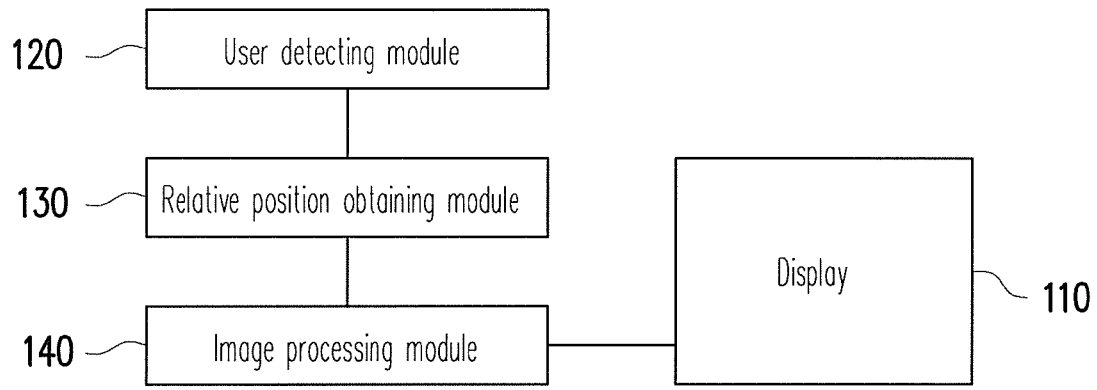
FIG. 1 is a block diagram of a device for adjusting an output frame according to an embodiment of the present disclosure.

FIG. 1 is a block diagram of a device for adjusting an output frame according to an embodiment of the present disclosure. Referring to FIG. 1, a device 100 for adjusting an output frame includes a display 110, a user detecting module 120, a relative position obtaining module 130 and an image processing module 140. The display 110 displays the output frame. The user detecting module 120 receives an input information related to the user. The relative position obtaining module 130 is connected to the user detecting module 120 and determines a relative position between the user and the display 110 with the input information received by the user detecting module 120. The image processing module 140 is simultaneously connected to the display 110 and the relative position obtaining module 130 to correspondingly adjust the output frame according to the relative position between the user and the display 110 before the display 110 displays the output frame.

According to an embodiment of the present disclosure, the user detecting module 120 can be an image capturing device such as a photograph lens, and the input information at the moment can be an input image captured by the image capturing device. The user detecting module 120 also receives the input image and determines the relative position between the user and the display 110 according to the input image. When the user is using the device 100 for adjusting the output frame, the image capturing device and the display 110 both face the user.

The device 100 for adjusting the output frame of the present disclosure can be applied in any electronic device with a display, e.g., mobile phones, personal digital assistants (PDAs), smartphones, personal computers or notebook computers. Herein, the present disclosure does not limit a range of the electronic device. Through operation of the device 100 for adjusting the output frame, the output frame is dynamically adjusted so that the electronic device maintains its optimal display result. In order to further illustrate the operation of the device 100 for adjusting the output frame, another embodiment is enumerated for more detailed description below.

Figure 2:
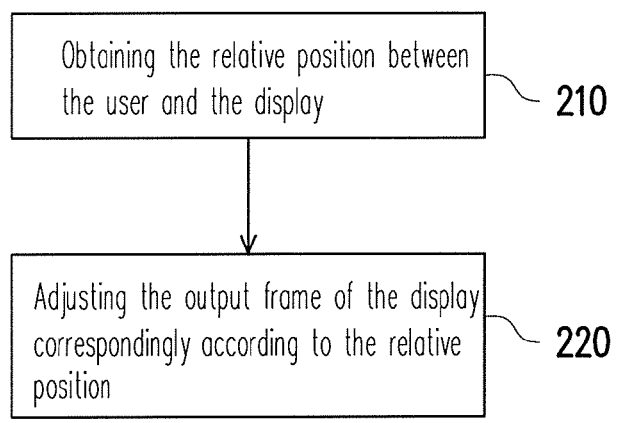
FIG. 2 is a flowchart showing a method for adjusting an output frame according to an embodiment of the present disclosure.

FIG. 2 is a flowchart showing a method for adjusting an output frame according to an embodiment of the present disclosure. Referring to both FIGS. 1 and 2, as shown by a step 210, the user detecting module 120 first provides the input information for the relative position obtaining module 130 to determine a current relative position between the user and the display 110. According to the present embodiment, the user detecting module 120 can be an image capturing device, and the input information provided by the user detecting module 120 is an input image. As such, steps for obtaining the relative position are shown by FIG. 3.

Figure 3:
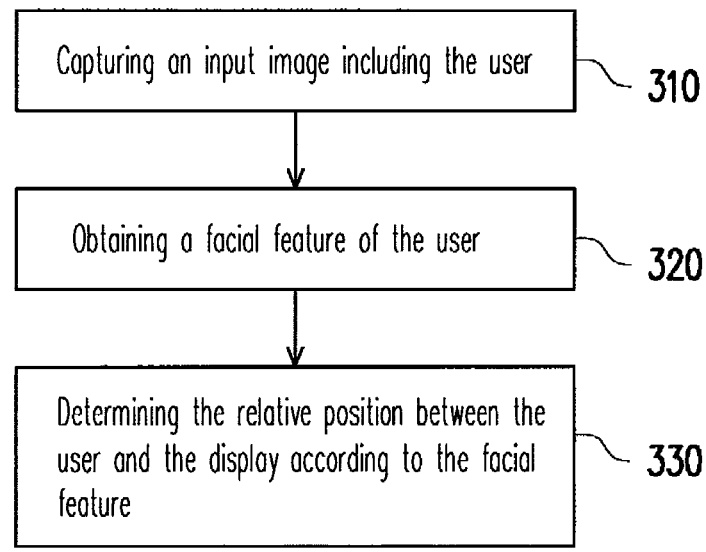
FIG. 3 is a flowchart of obtaining a relative position according to an embodiment of the disclosure.

In a step 310 of FIG. 3, first, the user detecting module 120 captures an input image including a photograph of the user. Afterwards, as shown by a step 320, the relative position obtaining module 130 obtains a facial feature of the user according to the input image. Herein, the facial feature can be eye positions, a nose position, a mouth position or a facial outline. The relative position obtaining module 130 can apply any facial detecting technology to obtain the facial feature, and the present disclosure is not limited in this aspect. Nevertheless, to facilitate illustration and considering that the eyes of the user are the most direct subject when viewing the output frame, it is presumed in all the following embodiments that the facial feature to be obtained by the relative position obtaining module 130 is the eye positions of the user.

After the eye positions of the user are obtained, subsequently in a step 330, the relative position obtaining module 130 determines a relative position (e.g., a distance, an angle, or a shift) between the user and the display 110 according to the eye positions. Several embodiments are enumerated as follows to illustrate steps of determining the relative position by the relative position obtaining module 130.

Figure 4:
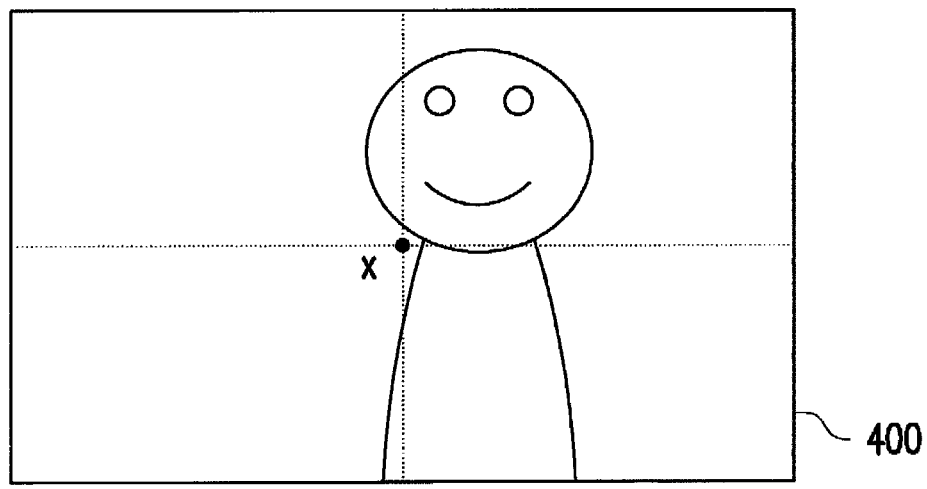
FIGS. 4, 5, 6, 7, 8, 9, and 10 are schematic views of an image including a user according to an embodiment of the present disclosure.
Figure 5:
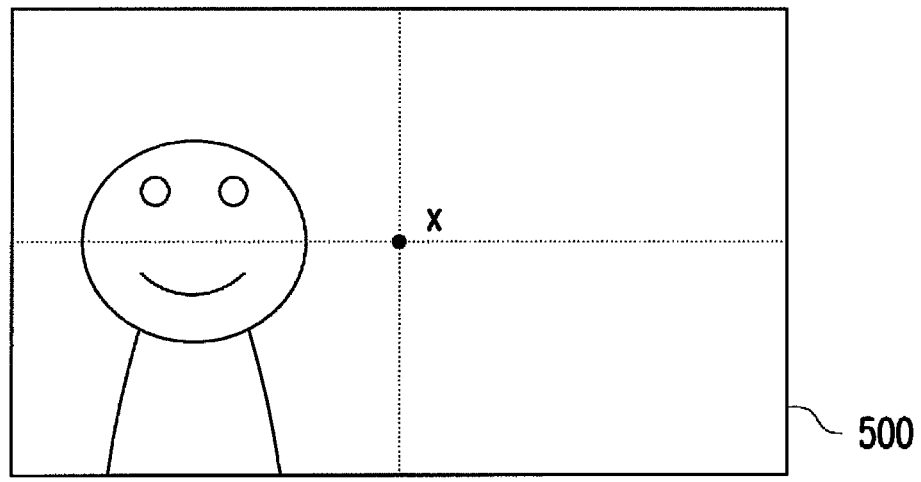

FIG. 4 is a schematic view of an input image including a user according to an embodiment of the present disclosure. Referring to FIG. 4, in the present embodiment, the relative position obtaining module 130 first obtains display positions of the user's eyes in an input image 400. Then, after a shift reference point X set on the input image 400 and the eye positions are compared, the eye positions are found to be higher than the shift reference point X. Hence, it is determined that the user is currently viewing the display 110 from an angle higher than the display 110. When the input image captured by the user detecting module 120 is an input image 500 as shown in FIG. 5, since the user's eyes in the input image 500 are positioned on the left of a central point X, it is determined that the user views the display 110 from an angle on the left of the display 110. In view of the foregoing, by comparing the eye positions with the central point, a shift of the user in an upper, a lower, the left or the right direction relative to the display 110 is determined. According to another embodiment, after the shift is obtained, a current view angle of the user can be further calculated from the shift. According to the present embodiment, the shift reference point X can be set in the central points of the input images 400 and 500, but the disposition of the shift reference point X actually is not limited to this.

Figure 6:
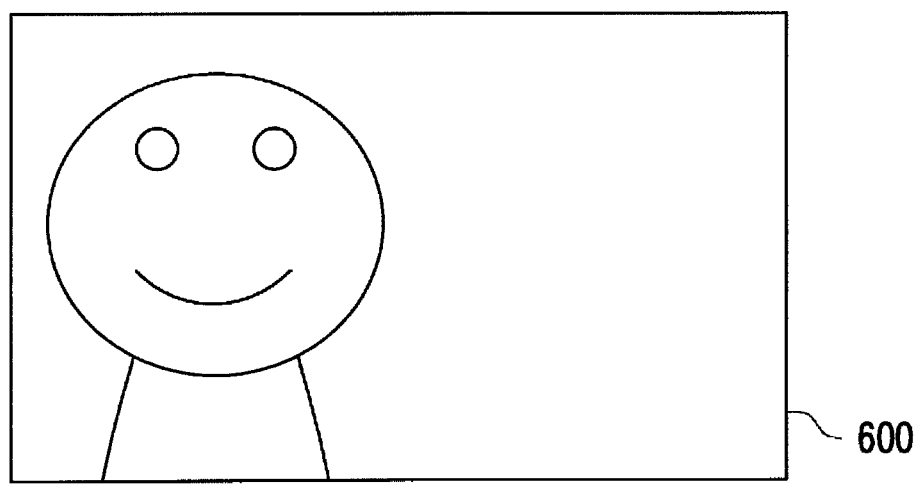
Figure 7:
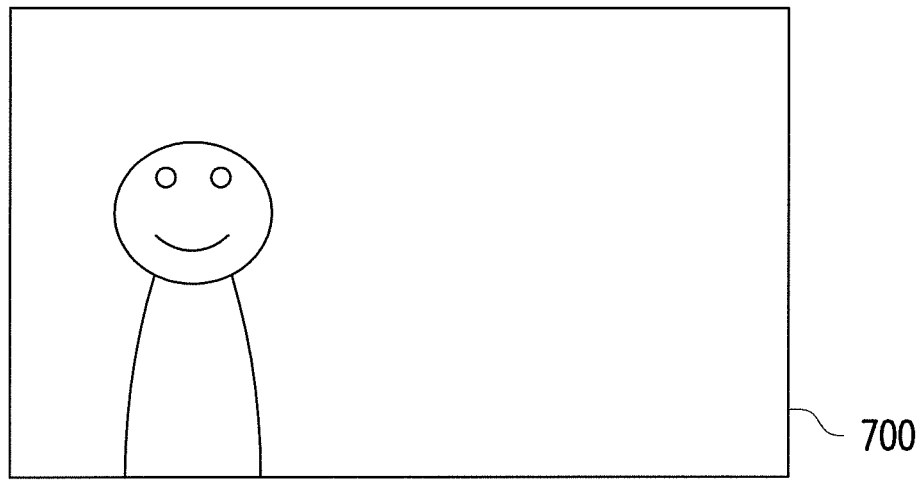

FIGS. 6 and 7 are schematic views of an input image including a user according to another embodiment of the present disclosure. In an input image 600, the relative position obtaining module 130 first determines the user's eye positions by the facial detecting technology, thereby obtaining the user's eye outlines. Thereafter, a size and proportion between the eye outlines and the input image 600 is calculated. Finally, the size and proportion and a preset proportion reference value are compared to determine a distance between the user and the display 110. For example, when the user is closer to the display 110, the size and proportion of the eyes in the input image becomes larger (as shown by the input image 600 in FIG. 6). When the user is farther away from the display 110, the proportion of the eyes in the input image becomes smaller (as shown by an input image 700 in FIG. 7). Therefore, a current distance between the user and the display 110 is determined by the size and proportion of the facial feature in the input image.

Figure 8:
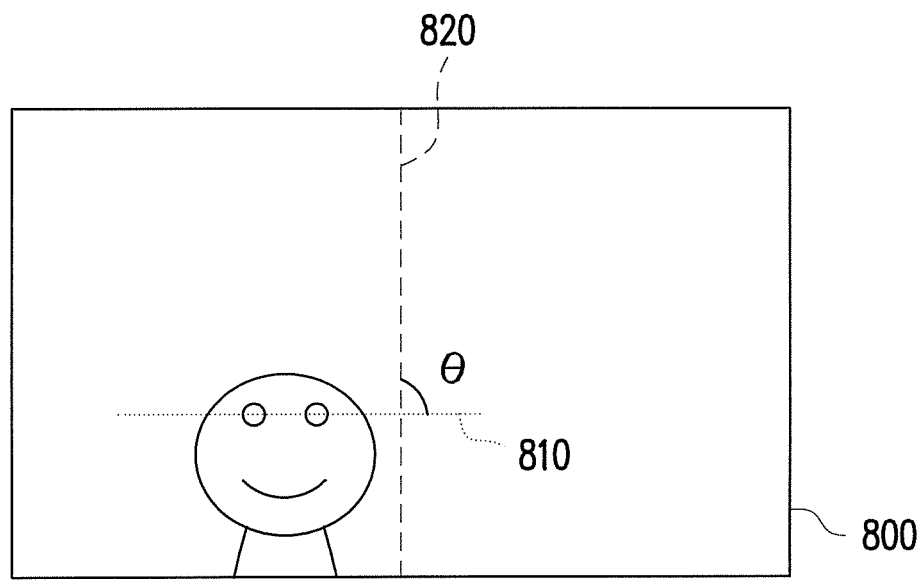
Figure 9:
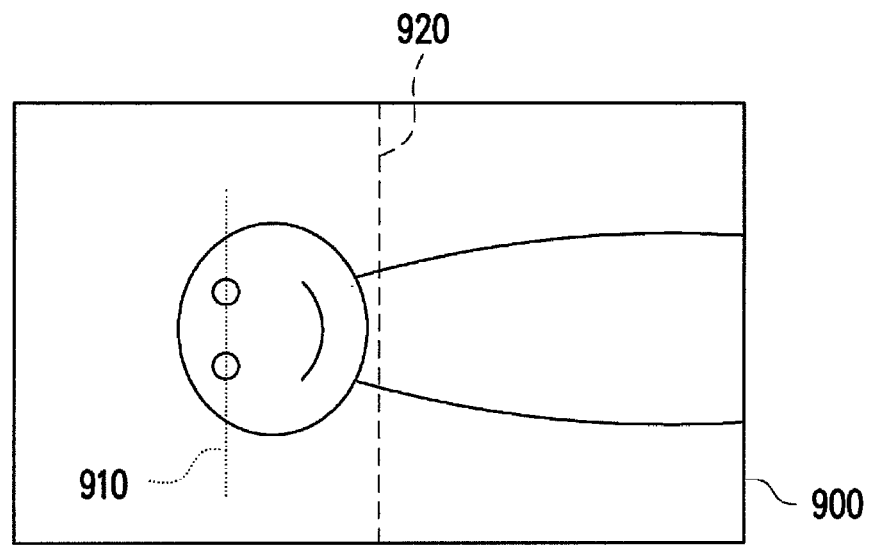

According to another embodiment, the user may have to rotate the display 110 for viewing because the frame is displayed in a different direction. Suppose before the user rotates the display 110, an input image 800 as shown in FIG. 8 is captured by the user detecting module 120. As shown by the input image 800, under circumstances where the display 110 is not rotated, an angle θ formed by a connected line 810 of the user's eye positions and a rotating reference line 820 set on the input image 800 is 90 degrees. When the user rotates the display 110 to the left by 90 degrees, an input image captured by the user detecting module 120 is an input image 900 as shown by FIG. 9, for example. In such a state, a connected line 910 of the user's eye positions is parallel to a rotating reference line 920 set on the input image 900. In other words, a rotating angle of the user relative to the display 110 can be determined by an angle formed by the connected line of the user's eye positions and the rotating reference line set on the input image. According to the present embodiment, the rotating reference lines 820 and 920 are a horizontal line or a vertical line preset on the input images 800 and 900 respectively, but the disposition of the rotating reference lines in fact is not limited thereto.

As described above, the relative position obtaining module 130 not only determines that the user is currently viewing the display 110 in a position slanting upwards or downwards, or slanting towards the left or the right according to the input image captured by the user detecting module 120. Meanwhile, the relative position obtaining module 130 also determines information as what the distance is between the user and the display 110 and whether or not the user rotates the display 110. However, it should be emphasized that the relative position obtaining module 130 can obtain the facial feature by any facial identification or detecting technology and calculate the relative position between the user and the display 110. In the present disclosure, the relative position is not limited to the shift, rotating angle and distance between the user and the display. Likewise, an algorithm for obtaining the relative position is not limited, either.

Next, reverting to a step 220 in FIG. 2, after obtaining the current relative position between the user and the display 110, the image processing module 140 adjusts the output frame of the display 110 correspondingly according to the relative position. According to an embodiment, the image processing module 140 timely scales the contents of the output frame according the distance between the user and the display 110. For example, when the distance between the user and the display 110 is farther, words or graphics in the output frame are automatically enlarged. When the user is very close to the display 110, the contents in the output frame such as words and graphics are displayed in a reduced size or a standard size.

According to another embodiment, when a shift occurs between the user and the display 110, the image processing module 140 can, for example, shift the output frame correspondingly in a direction of the shift so as to achieve an effect similar to rolling frames. Or, after a current view angle and position of the user is calculated according to the shift, when the user is determined as being in a dead angle of gray scale inversion of an LCD, the image processing module 140 first adjusts colors of the output frame and then controls the display 110 to output the frames so that the user sees the frames in the correct colors.

Figure 10:
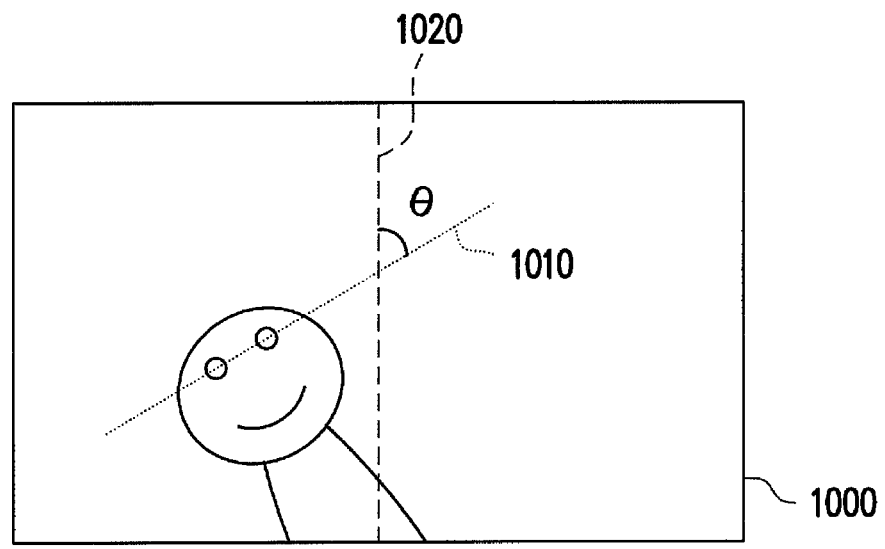

Furthermore, when a rotating angle exists between the user and the display 110, the image processing module 140 rotates the output frame correspondingly according to the rotating angle. For example, when the user rotates the display 110 by 90 degrees, the image processing module 140 changes a display direction of the output frame from the original vertical direction to a horizontal direction. It should be noted that besides rotating the output frame by 90 degrees, if the user detecting module 120 captures an input image 1000 as shown by FIG. 10, the image processing module 140 also rotates the output frame correspondingly according to an angle θ formed by a connected line 1010 of the user's eye positions and a rotating reference line 1020 set on the input image 1000 (i.e., the output frame being rotated by θ degrees and then outputted by the display 110). Thus, the user can view the words or graphics in the output frame more conveniently.

In addition to changing the size and the display direction of the output frame, according to an embodiment, the image processing module 140 can further change the contents of the output frame according to the relative position between the user and the display 110. For example, when the user is close to the display 110, the image processing module 140 controls the display 110 to output a frame with an analog clock. When the user keeps a farther distance from the display 110, the output frame is changed into a digital clock to enhance readability. According to still another embodiment, the image processing module 140 can further display different output frames according to the angle at which the user rotates the display 110 so as to achieve an effect similar to displaying a laser animation sticker or flipping through pages.

According to another embodiment, suppose the display 110 is a 3D display. When the relative position between the user and the display 110 indicates that the user is located exactly in a dead view angle, the image processing module 140 optimizes the output frame by adjusting pixels of the output frame, for example, to present the best 3D display result so that the view angle issue of the 3D display is resolved.

In summary, the method and the device for adjusting the output frame in the present disclosure correspondingly adjusts the output frame according to the relative position between the user and the display. Thereby, the output frame is displayed not only in the most suitable size, the most correct colors and the best angle, flexibility of the output frame is also enhanced simultaneously so that the user enjoys the optimal display result in any view position, and the impression formed from use of the electronic device improves as well.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for adjusting an output frame, suitable for an electronic device with a display, the method comprising:
   obtaining a relative position between a user and the display by a relative position obtaining module; and
   adjusting an output frame of the display according to the relative position by an image processing module,
   wherein adjusting the output frame comprises scaling the output frame based on a distance between the user and the display such that when the distance is farther, a content in the output frame is enlarged accordingly,
   wherein when the distance is shorter than a set distance, the content in the output frame is displayed in a reduced size or an original size accordingly,
   wherein a current view angle based on the relative position of the user is calculated with respect to a shift, when the user is determined as being in a dead angle of gray scale inversion of the display, the image processing module first adjusts colors of the output frame and then controls the display to display the output frame so that the user sees the output frame in correct colors.

2. The method for adjusting the output frame as claimed in claim 1, wherein obtaining the relative position between the user and the display comprises:
   capturing an input image;
   obtaining a facial feature of a user from the input image; and
   determining the relative position between the user and the display according to the facial feature.

3. The method for adjusting the output frame as claimed in claim 2, wherein the facial feature comprises at least one of the following: eye positions, a nose position, a mouth position and a facial outline.

4. The method for adjusting the output frame as claimed in claim 3, wherein determining the relative position according to the facial feature comprises:
   determining a rotating angle of the user relative to the display according to an angle formed by a connected line of the eye positions and a rotating reference line set on the input image.

5. The method for adjusting the output frame as claimed in claim 2, wherein determining the relative position according to the facial feature comprises:
   determining a shift of the user relative to the display according to a shift reference point set on the input image and a position of the facial feature in the input image.

6. The method for adjusting the output frame as claimed in claim 2, wherein determining the relative position according to the facial feature comprises:
   obtaining a size and proportion of the facial feature relative to the input image; and
   comparing a proportion reference value and the size and proportion to determine a distance between the user and the display.

7. The method for adjusting the output frame as claimed in claim 1, wherein the output frame is adjusted by at least one of scaling the output frame, rotating the output frame and shifting the output frame.

8. The method for adjusting the output frame as claimed in claim 1, wherein the output frame is adjusted by adjusting colors of the output frame.

9. The method for adjusting the output frame as claimed in claim 1, wherein the output frame is adjusted by changing contents of the output frame.

10. The method for adjusting the output frame as claimed in claim 1, wherein the output frame is adjusted by adjusting pixels of the output frame.

11. A device for adjusting an output frame, comprising:
    a display, for displaying the output frame;
    a user detecting module, for obtaining an input information related to a user, wherein a distance between the user and the display is also detected;
    a relative position obtaining module, connected to the user detecting module and used for determining a relative position between the user and the display with the input information; and
    an image processing module, connected to the display and the relative position obtaining module to adjust the output frame according to the relative position and controlling the display to display the output frame,
    wherein adjusting the output frame comprises scaling the output frame based on the distance between the user and the display such that when the distance is farther, a content in the output frame is enlarged accordingly,
    wherein when the distance is shorter, the content in the output frame is displayed in a reduced size or an original size accordingly,
    wherein a current view angle based on the relative position of the user is calculated with respect to a shift, when the user is determined as being in a dead angle of gray scale inversion of the display, the image processing module first adjusts colors of the output frame and then controls the display to display the output frame so that the user sees the output frame in correct colors.

12. The device for adjusting the output frame as claimed in claim 11, wherein the user detecting module is an image capturing device, the input information is an input image comprising the user, and the relative position obtaining module obtains a facial feature of the user from the input image and determines the relative position between the user and the display according to the facial feature.

13. The device for adjusting the output frame as claimed in claim 12, wherein the facial feature comprises at least one of the following: eye positions, a nose position, a mouth position and a facial outline.

14. The device for adjusting the output frame as claimed in claim 13, wherein the relative position obtaining module determines a rotating angle of the user relative to the display according to an angle formed by a connected line of the eye positions and a rotating reference line set on the input image.

15. The device for adjusting the output frame as claimed in claim 12, wherein the relative position obtaining module determines a shift of the user relative to the display according to a shift reference point preset on the input image and a position of the facial feature in the input image.

16. The device for adjusting the output frame as claimed in claim 12, wherein the relative position obtaining module obtains a size and proportion of the facial feature relative to the input image and compares a proportion reference value and the size and proportion to determine a distance between the user and the display.

17. The device for adjusting the output frame as claimed in claim 11, wherein the image processing module carries out at least one of scaling the output frame according to the relative position, rotating the output frame according to the relative position and shifting the output frame according to the relative position.

18. The device for adjusting the output frame as claimed in claim 11, wherein the image processing module adjusts colors of the output frame according to the relative position.

19. The device for adjusting the output frame as claimed in claim 11, wherein the image processing module changes contents of the output frame according to the relative position.

20. The device for adjusting the output frame as claimed in claim 11, wherein the image processing module adjusts pixels of the output frame according to the relative position.

* * * * *